United States Patent
Sumioka et al.

(10) Patent No.: US 12,463,560 B2
(45) Date of Patent: Nov. 4, 2025

(54) VIBRATION DRIVING DEVICE FOR A STRONG MAGNETIC-FIELD ENVIRONMENT

(71) Applicant: CANON KABUSHIKI KAISHA, Tokyo (JP)

(72) Inventors: Jun Sumioka, Kanagawa (JP); Shinji Yamamoto, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 901 days.

(21) Appl. No.: 17/668,950

(22) Filed: Feb. 10, 2022

(65) Prior Publication Data
US 2022/0263432 A1 Aug. 18, 2022

(30) Foreign Application Priority Data
Feb. 17, 2021 (JP) ................. 2021-023442

(51) Int. Cl.
| | | |
|---|---|---|
| *H02N 2/14* | (2006.01) | |
| *A61B 5/055* | (2006.01) | |
| *H01F 27/29* | (2006.01) | |
| *H01F 27/32* | (2006.01) | |
| *H02N 2/10* | (2006.01) | |

(52) U.S. Cl.
CPC ............. *H02N 2/145* (2013.01); *A61B 5/055* (2013.01); *H01F 27/29* (2013.01); *H01F 27/325* (2013.01); *H02N 2/103* (2013.01)

(58) Field of Classification Search
CPC ...... H02N 2/145; H02N 2/103; H02N 2/0015; H02N 2/026; H02N 2/163; H02N 2/065; H02N 2/147; H01F 27/29; H01F 27/325; H01F 30/08; A61B 5/055; G01R 33/28
See application file for complete search history.

(56) References Cited

U.S. PATENT DOCUMENTS

| | | | | |
|---|---|---|---|---|
| 10,355,621 B2* | 7/2019 | Sumioka | ............... | H02N 2/0015 |
| 2006/0039169 A1* | 2/2006 | Chen | ................... | H02M 3/3374 |
| | | | | 363/17 |
| 2006/0043845 A1* | 3/2006 | Maruyama | ............. | H02N 2/007 |
| | | | | 310/358 |
| 2006/0173412 A1* | 8/2006 | Susi | ...................... | A61M 5/142 |
| | | | | 604/123 |
| 2009/0127974 A1* | 5/2009 | Piotr | ...................... | H02N 2/025 |
| | | | | 310/317 |

(Continued)

FOREIGN PATENT DOCUMENTS

| | | |
|---|---|---|
| CN | 208028792 U | 10/2018 |
| JP | H0584296 A | 4/1993 |

(Continued)

*Primary Examiner* — Emily P Pham
(74) *Attorney, Agent, or Firm* — Canon U.S.A., Inc. IP Division

(57) ABSTRACT

A vibration driving device includes a vibration actuator including a vibrating body and a contact body, the vibrating body including an elastic body and an electromechanical energy conversion element, the contact body being in contact with the vibrating body and movable relatively to the vibrating body; and a control device including a signal generating circuit and a boosting circuit, the boosting circuit including an air-core transformer electrically connected to the signal generating circuit. The vibration actuator is configured to receive a signal output by the control device.

14 Claims, 13 Drawing Sheets

(56) References Cited

U.S. PATENT DOCUMENTS

| | | | | |
|---|---|---|---|---|
| 2014/0021358 A1* | 1/2014 | Wieringa | ............... | G01T 1/20 |
| | | | | 250/389 |
| 2016/0077133 A1* | 3/2016 | Lee | ............... | H01F 38/30 |
| | | | | 324/127 |
| 2018/0261442 A1* | 9/2018 | Kamata | ............... | H01J 49/022 |
| 2019/0198997 A1* | 6/2019 | Wanderoild | ............... | G05F 7/00 |
| 2020/0206368 A1* | 7/2020 | Thu | ............... | A61K 49/1863 |
| 2022/0103108 A1* | 3/2022 | Morita | ............... | H02P 25/032 |
| 2022/0157511 A1* | 5/2022 | Yamada | ............... | H01F 41/043 |

FOREIGN PATENT DOCUMENTS

| | | |
|---|---|---|
| JP | H11341841 A | 12/1999 |
| JP | 2002291254 A | 10/2002 |
| JP | 3404384 B2 | 5/2003 |
| JP | 2003285008 A | 10/2003 |
| JP | 2006523123 A | 10/2006 |
| JP | 2009514497 A | 4/2009 |
| JP | 2009522996 A | 6/2009 |
| JP | 2009156680 A | 7/2009 |
| JP | 2011109882 A | 6/2011 |
| JP | 2012231595 A | 11/2012 |
| JP | 2018078769 A | 5/2018 |

* cited by examiner

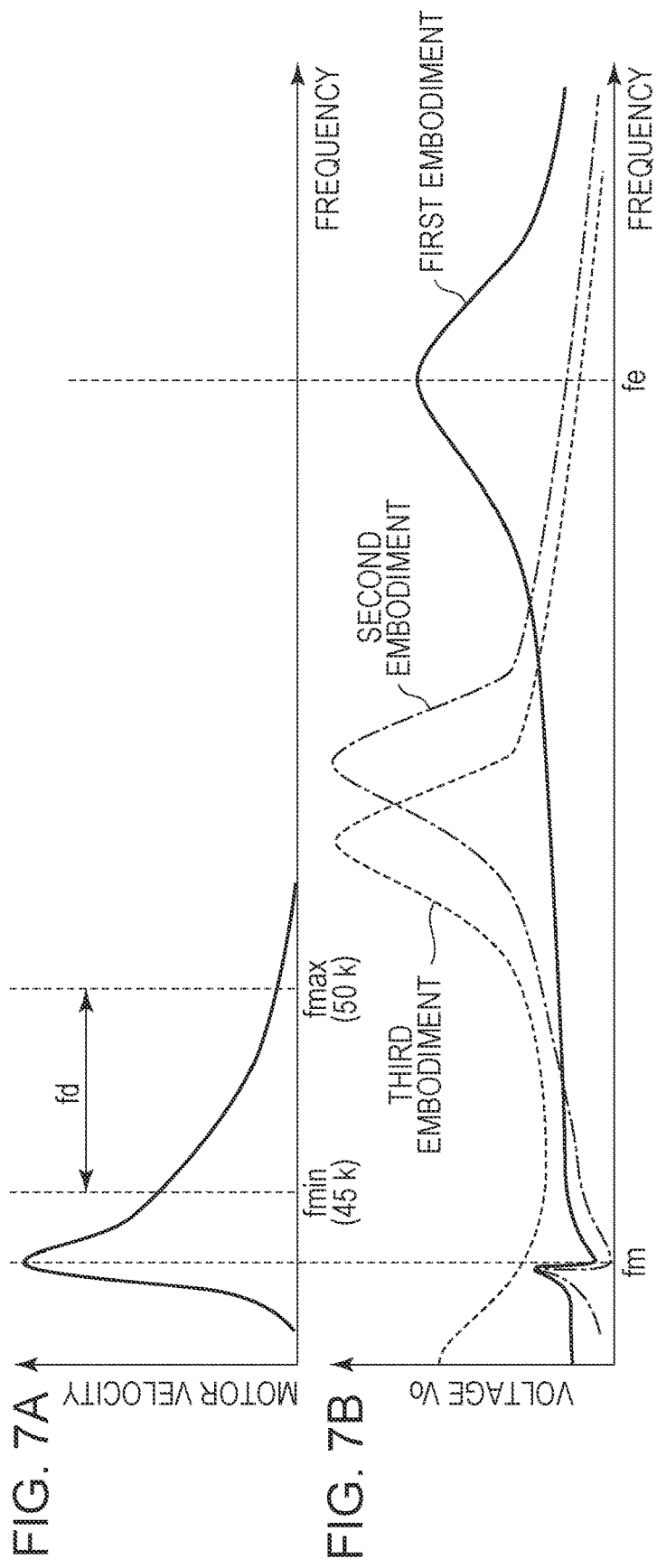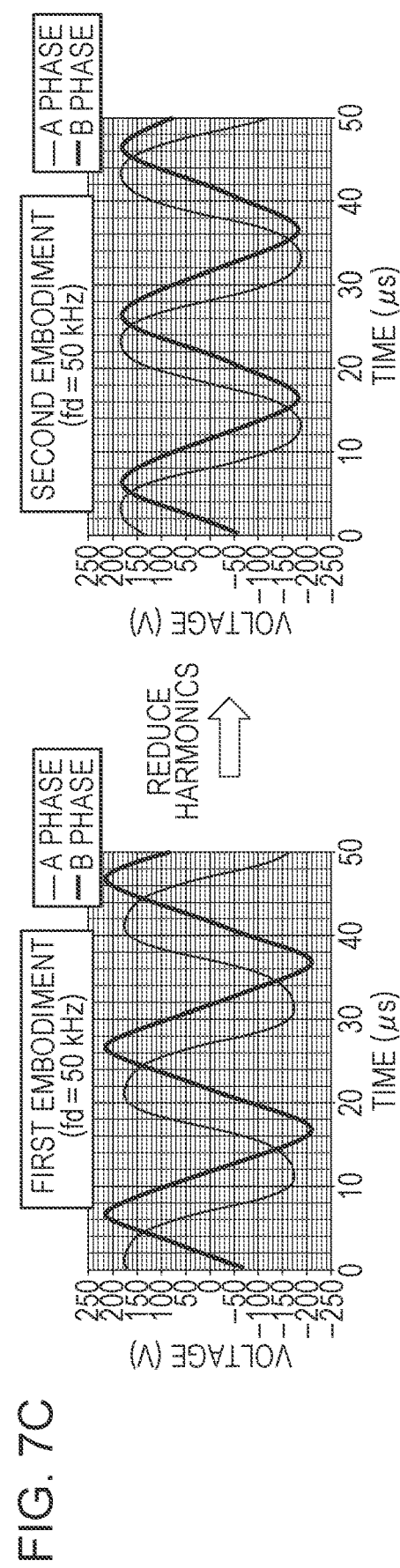

FIRST VIBRATION MODE

SECOND VIBRATION MODE

VIBRATION DRIVING DEVICE FOR A STRONG MAGNETIC-FIELD ENVIRONMENT

BACKGROUND

Field of the Disclosure

The present disclosure relates to a vibration driving device and a medical apparatus that are to be used under a strong-magnetic-field environment.

Description of the Related Art

A vibration actuator uses high-frequency vibration generated by applying an alternating-current (AC) voltage to an electromechanical energy conversion element, such as a piezoelectric element, coupled to an elastic body.

A vibration actuator is widely known as a non-electromagnetically driven actuator configured to use the vibration energy thereof as continuous mechanical motion. A control device that controls the vibration actuator includes a driving unit. The driving unit includes a pulse signal generating circuit that generates pulse signals, and a booster circuit that applies AC voltage signals amplified by a coil or a transformer to a piezoelectric element included in a vibrating body. The vibration actuator is capable of controlling a motor velocity by changing the frequency, amplitude, or phase difference of the AC voltage signals applied to the piezoelectric element.

The vibration actuator may be applied to a medical apparatus that is to be used under a strong-magnetic-field environment. For example, Japanese Patent Laid-Open No. 5-84296 discloses an example in which a vibration actuator formed of a nonmagnetic body is used for a medical injection apparatus that does not cause a failure resulting from generation of a magnetic field or cutoff of magnetic lines of force even when being used with an apparatus using magnetism, such as a magnetic resonance imaging (MRI) apparatus. However, a control device of the vibration actuator includes a coil or transformer including a magnetic body, and thus the control device is incapable of operating under a strong-magnetic-field environment and is to be installed in a place away from the strong magnetic field by using an extended cable. This is because a core as a magnetic body causes magnetic saturation due to an influence of an external magnetic flux, and the inductance component of the transformer or coil significantly decreases. As a result, an excessive current flows through the circuit under the strong-magnetic-field environment, and it is impossible to boost AC voltage signals for driving the vibration actuator.

Japanese Patent No. 3404384 discloses an inverter circuit that drives a load, such as a cold-cathode tube, as an example of a device the operation of which is not adversely affected even under a strong-magnetic-field environment. A boosting circuit according to Japanese Patent No. 3404384 performs boosting mainly using a piezoelectric transformer and accessorily uses an air-core transformer or an air-core coil. The air-core transformer or the air-core coil not including a core is capable of operating without being adversely affected by a surrounding magnetic field. However, boosting efficiency is low and power consumption is high due to an increase in windings.

Japanese Patent No. 3404384 proposes, as a method for overcoming low boosting efficiency, using of a multilayer piezoelectric transformer having high boosting efficiency.

As described above, in an existing medical apparatus, a control device is to be installed away from a magnetic-field environment by using an extended cable, and the portability is impaired. In addition, a piezoelectric transformer is to be used for a boosting circuit that is not affected by an external magnetic flux. However, the piezoelectric transformer is typically expensive, and sufficient boosting efficiency is not obtained when being driven at a frequency different from a resonant frequency specific to the piezoelectric transformer. In a typical case, for example, boosting is hardly achieved in driving at a frequency different by 1 kHz from the resonant frequency. In contrast, in the case of controlling the velocity of a vibration actuator, the frequency is to be operated in a wide range of about 5 kHz during driving, and it is difficult to use a piezoelectric transformer for a boosting circuit. Furthermore, there is difficulty in terms of variations of the resonant frequency resulting from the individual difference of the vibration actuator.

In addition, a load resistance electrically connected to an output side of the piezoelectric transformer is limited to a resistance having a high impedance of 100 kΩ or more through which a current hardly flows. Thus, a vibration actuator, having an impedance of 1 kΩ or less during driving, is incapable of performing boosting even when being connected.

SUMMARY

The present disclosure provides a portable vibration driving device capable of operating under a strong-magnetic-field environment.

According to an aspect of the present disclosure, a vibration driving device includes a vibration actuator including a vibrating body and a contact body, the vibrating body including an elastic body and an electromechanical energy conversion element, the contact body being in contact with the vibrating body and movable relatively to the vibrating body; and a control device including a signal generating circuit and a boosting circuit, the boosting circuit including an air-core transformer electrically connected to the signal generating circuit. The vibration actuator is configured to receive a signal output by the control device.

Further features of the present disclosure will become apparent from the following description of exemplary embodiments with reference to the attached drawings.

BRIEF DESCRIPTION OF THE DRAWINGS

FIGS. 7A to 7C are diagrams illustrating the velocity of the vibration actuator according to an embodiment and frequency characteristics of AC voltage signals.

DESCRIPTION OF THE EMBODIMENTS

First Embodiment

Figure 1A:
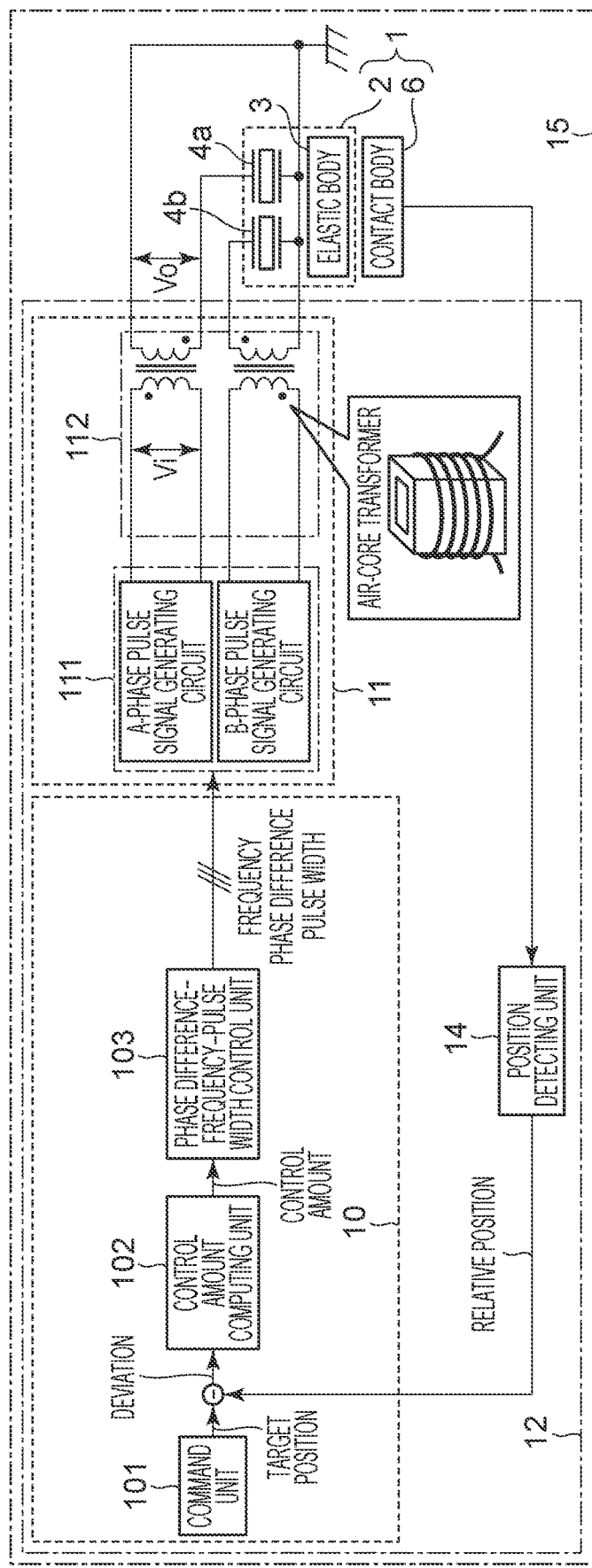
FIG. 1A is a diagram illustrating a vibration driving device according to an embodiment of the present disclosure.

FIG. 1A is a diagram illustrating a vibration driving device 15 according to the present embodiment.

The vibration driving device 15 includes a vibration actuator 1 and a control device 12 that controls the vibration actuator 1. The vibration actuator 1 includes a vibrating body 2 and a contact body 6. The vibrating body 2 includes an elastic body 3 and a piezoelectric element 4, which is an electromechanical energy conversion element. The contact body 6 is in pressure contact with the vibrating body 2 and moves relatively to the vibrating body 2. This configuration enables the vibrating body 2 and the contact body 6 to move relatively to each other.

The control device 12 includes a control unit 10, a driving unit 11, and a position detecting unit 14, and detects a relative position of the vibrating body 2 and the contact body 6 to control the position or velocity of the vibration actuator 1.

The control unit 10 includes a command unit 101, a control amount computing unit 102, and a phase difference-frequency-pulse width control unit 103. The control unit 10 performs computation based on a difference between a target position and a detected relative position, and outputs an operation parameter. The command unit 101 generates a target position of a relative position for each of times, and a difference between the relative position detected by the position detecting unit 14 and the target position is computed as a deviation. As for the target position, for example, one command value is output in each control sampling. The control sampling means one cycle starting from acquisition of a deviation, including output of a control amount, input of an AC voltage signal to the piezoelectric element 4, and detection of a relative velocity and relative position of the vibrating body 2 and the contact body 6, and ending immediately before start of acquisition of a deviation in FIG. 1. In the cycle, the position of the vibration actuator 1 is feedback-controlled. The command unit 101 may output a target velocity, and the position detecting unit 14 may calculate a relative velocity, so as to feedback-control the velocity of the vibration actuator 1.

The deviation is input to the control amount computing unit 102, which outputs a control amount. The control amount computing unit 102 computes the deviation by using a proportional-integral-differential (PID) compensator or the like, and outputs a control amount. The PID compensator is addition of outputs from compensators having respective functions of proportional (P), integral (I), and differential (D), and is a control computer generally used to compensate for phase delay or gain of a control target and to establish a stable and highly accurate control system. The control amount is input to the phase difference-frequency-pulse width control unit 103 that operates a vibration amplitude, a vibration direction, and an amplitude ratio of a driving mode that occurs in the vibrating body 2, converted to a frequency, a phase difference, and a pulse width based on the control amount, and is output as operation parameters.

The control unit 10 is constituted by, for example, a digital device such as a central processing unit (CPU) or a programmable logic device (PLD) including an application specific integrated circuit (ASIC), or an element such as an analog-to-digital (A/D) converter. The control unit 10 is not necessarily constituted by a single element or circuit, and may be constituted by a plurality of elements or circuits.

The operation parameters (frequency, phase difference, and pulse width) output from the control unit 10 are input to the driving unit 11, and the velocity and driving direction of the vibration actuator 1 are controlled.

Figure 1C:
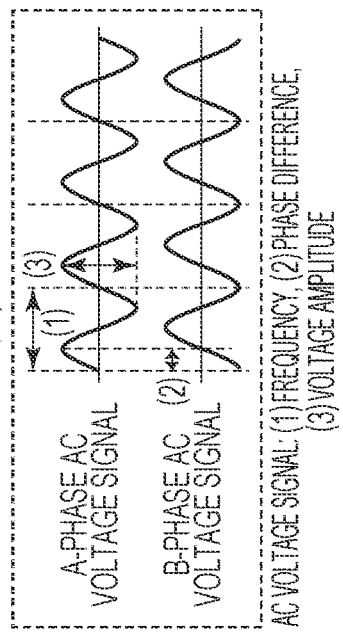
FIG. 1C is a diagram illustrating AC voltage signals.
Figure 1B:
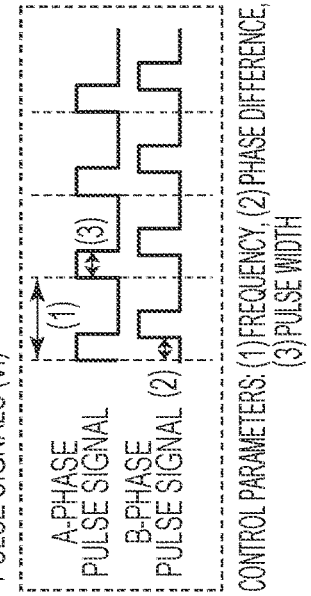
FIG. 1B is a diagram illustrating pulse signals.

The driving unit 11 includes a pulse signal generating circuit 111 and a booster circuit 112, and controls at least one of the frequency, phase difference, or pulse width of a voltage applied to the vibration actuator 1 to drive the vibration actuator 1. The pulse signal generating circuit 111 generates an A-phase pulse signal (Vi) and a B-phase pulse signal (Vi) based on the frequency, the phase difference, and the pulse width. The pulse signals Vi are, for example, square-wave signals of 24 Vpp, and are output in accordance with the operation parameters (frequency, phase difference, and pulse width) as illustrated in FIG. 1B. The booster circuit 112 includes an air-core transformer according to the present embodiment and boosts pulse signals to a desired voltage. Boosted AC voltage signals (Vo) of two phases are respectively applied to an electrode of a piezoelectric element 4a of the A phase and an electrode of a piezoelectric element 4b of the B phase. The AC voltage signals Vo are, for example, SIN-wave signals of around 400 Vpp, are controlled in accordance with the operation parameters (frequency, phase difference, and pulse width) as illustrated in FIG. 1C, and are capable of controlling the velocity of the vibration actuator 1.

The pulse signal generating circuit 111 includes, for example, a CPU, a function generator, a switching circuit, and a power source. The pulse signal generating circuit 111 is not necessarily constituted by a single element or circuit, and may be constituted by a plurality of elements or circuits.

Figure 3A:
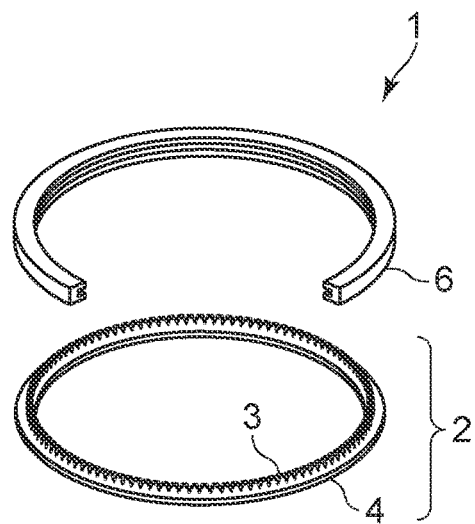
FIGS. 3A to 3C are diagrams for describing a rotational-driving vibration actuator.
Figure 3B:
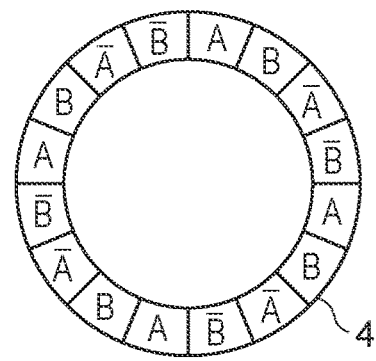
Figure 3C:
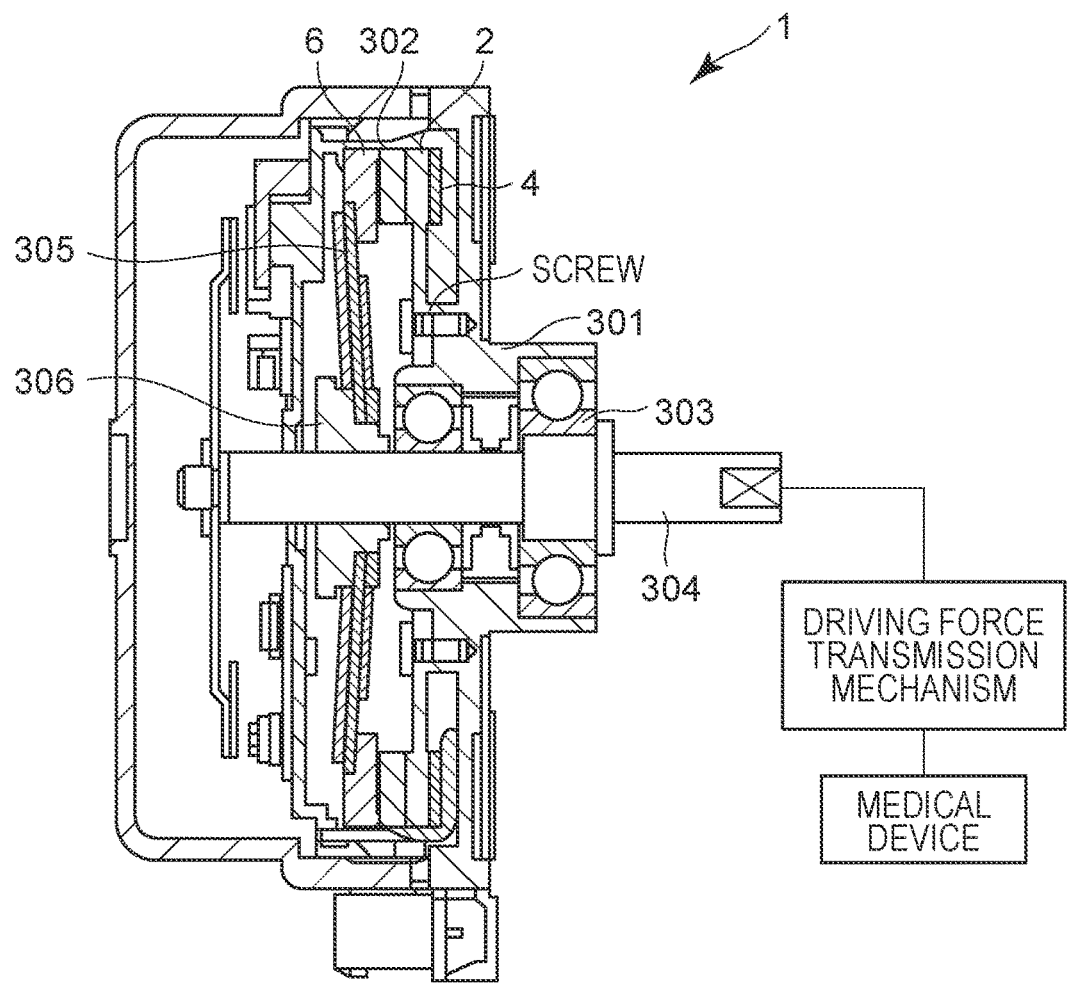

FIGS. 3A to 3C are diagrams for describing a rotational-driving vibration actuator applicable to the present disclosure.

FIG. 3A is a perspective view of the vibrating body 2 and the contact body 6 constituting the vibration actuator 1 used in the present embodiment. The vibrating body 2 includes the elastic body 3, which is annular-shaped and provided with a plurality of protrusions, and the piezoelectric element 4, which is an electromechanical energy conversion element, bonded to one face of the elastic body 3.

The "contact body 6" is a member that contacts a vibrating body and is moved relatively to the vibrating body by vibration generated in the vibrating body. The contact between the contact body and the vibrating body is not limited to a direct contact in which another member is not interposed between the contact body and the vibrating body.

The contact between the contact body and the vibrating body may be an indirect contact in which another member is interposed between the contact body and the vibrating body as long as the contact body is moved relatively to the vibrating body by vibration generated in the vibrating body. "Another member" is not limited to a member that is independent of the contact body and the vibrating body. "Another member" may be a surface treatment portion formed on the contact body or the vibrating body by plating or nitriding.

FIG. 3B is a plan view illustrating an electrode pattern of the piezoelectric element 4, which is an electromechanical energy conversion element. The vibrating body 2 and the contact body 6 are annular shaped and are disposed coaxially. The contact body 6 is in pressure contact with the vibrating body 2 in the state of being rotatably supported. The vibrating body 2 has a structure in which the ring-shaped piezoelectric element 4 having the electrode pattern illustrated in FIG. 3B is bonded to a lower surface of a ring-shaped elastic member (a surface opposite to a surface that is in pressure contact with the contact body 6). The electrode pattern of the piezoelectric element 4 is formed such that the number of waves of progressive vibration generated in the vibrating body 2 is four in one rotation. The number of waves of progressive vibration is not limited to four. In FIG. 3B, "A" represents an A phase, a character having a bar above "A" represents an A' phase, "B" represents a B phase, and a character having a bar above "B" represents a B' phase. The vibrating body 2 is fixed. As a result of applying AC voltage signals Vo to the piezoelectric element 4 by using the vibration driving device 15 illustrated in FIG. 1, the contact body 6 is rotated and the position of the contact body 6 relative to the vibrating body 2 is changed.

FIG. 3C illustrates a detailed configuration of the vibration actuator 1 of a progressive wave type used in the present embodiment. The vibration actuator 1 includes the vibrating body 2 fixed to a housing 301 with a screw, the contact body 6 that is in friction contact with the vibrating body 2 with a friction material 302 interposed therebetween, an output shaft 304 rotatably supported by a ball bearing 303 in the housing 301, and a pressure spring 305. The pressure spring 305 generates a pressure force for causing the contact body 6 to pressure contact the vibrating body 2, and transmits rotation of the contact body 6 to the output shaft 304 through a transmission portion 306. To the output shaft 304, a medical device driven by the vibration actuator 1 is connected via a driving force transmission mechanism.

Figure 6A:
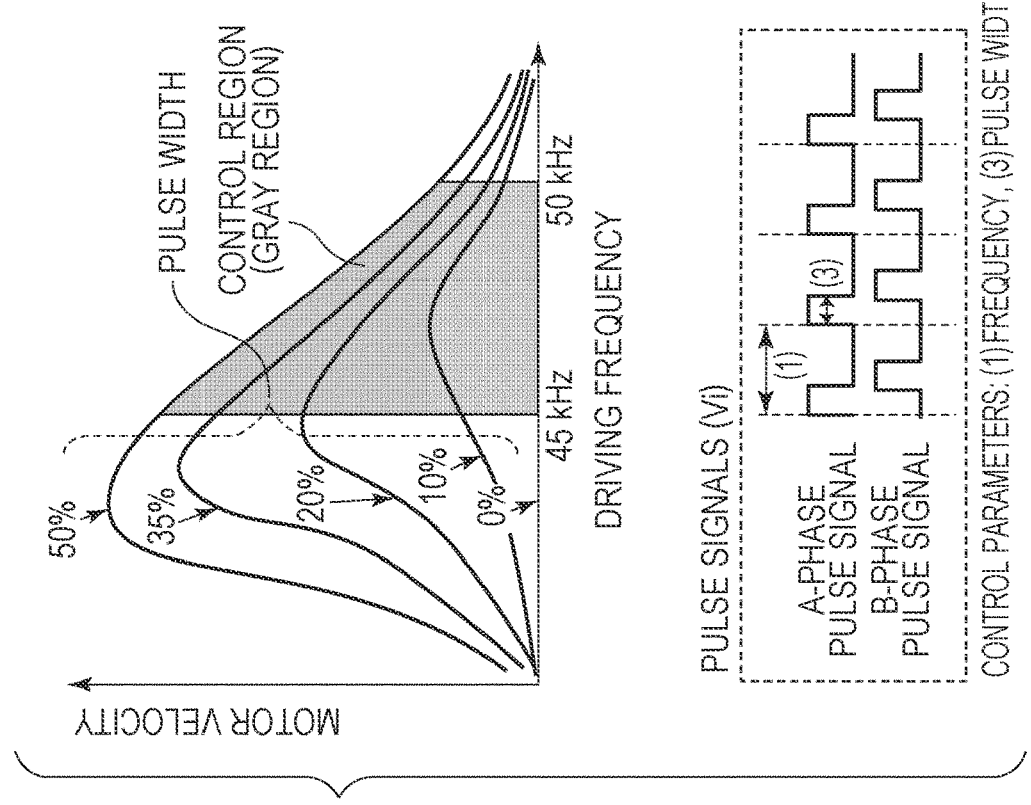
FIGS. 6A and 6B are diagrams illustrating velocity characteristics of the vibration actuator based on a control amount.
Figure 6B:
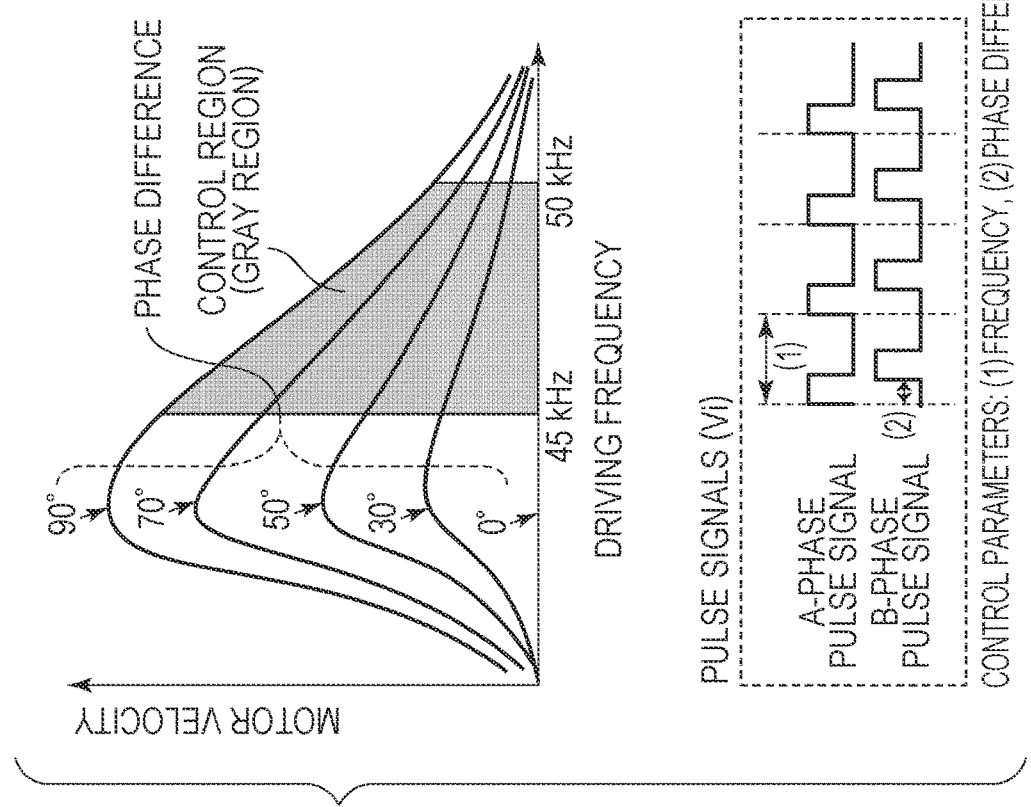

FIGS. 6A and 6B are diagrams illustrating velocity characteristics of the vibration actuator 1 based on operation parameters.

FIG. 6A illustrates a case in which the velocity of the vibration actuator 1 is controlled by using a phase difference and a frequency. The horizontal axis represents frequency, and the vertical axis represents motor velocity. As illustrated in FIG. 6A, the motor velocity can be controlled by individually operating the phase difference and the frequency. For example, in the case of performing control in the gray region in FIG. 6A, individual operation parameters are output within the range in which the driving frequency is 45 to 50 kHz and the phase difference is 0 to ±90 degrees. FIG. 6B illustrates a case in which the velocity of the vibration actuator 1 is controlled by using a pulse width and a frequency. Similarly to the above, the motor velocity can be controlled by individually operating the pulse width and the frequency. For example, in the case of performing control in the gray region in FIG. 6B, individual operation parameters are output within the range in which the driving frequency is 45 to 50 kHz and the pulse width is 0 to 50%. In this case, a driving direction is operated by switching the phase difference within ±90 degrees. For more simplicity, control may be performed by using only frequency as an operation parameter. Alternatively, three operation parameters may be simultaneously changed. Alternatively, the operation parameters may be switched step by step by providing a predetermined velocity range.

Figure 4:
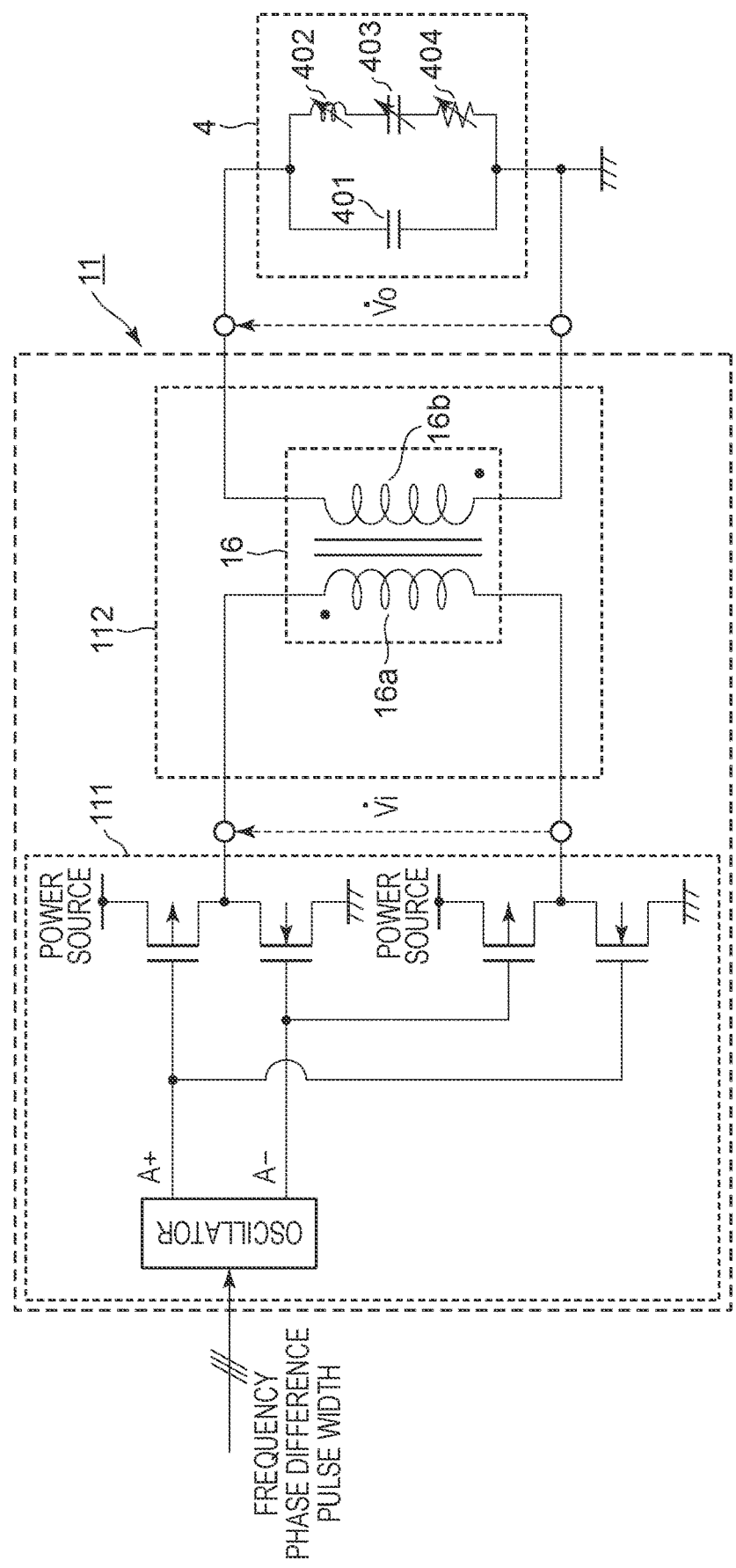
FIG. 4 is a diagram illustrating a driving unit according to a first embodiment of the present disclosure.

FIG. 4 is a diagram illustrating the driving unit 11 in the first embodiment of the present disclosure. The driving unit 11 constitutes part of the control device 12. The driving unit 11 includes the pulse signal generating circuit 111 that generates pulse signals Vi and the booster circuit 112 that applies boosted AC voltage signals Vo to the piezoelectric element 4. For convenience of description, a driving unit that outputs an AC voltage signal of one phase will be described here. The pulse signal generating circuit 111 includes an oscillator that operates in accordance with operation parameters (frequency, phase difference, and pulse width) input from the control unit 10, which is not illustrated in FIG. 4, a switching circuit (H-bridge circuit), and a power source. The oscillator outputs an A+ pulse width modulation (PWM) signal and an A– PWM signal having a phase different by 180 degrees from that of the A+ PWM signal. Switching elements are ON/OFF controlled, and square-wave pulse signals Vi are output. The switching circuit is connected to a DC-DC converter circuit, a battery, and the like (not illustrated) supplying DC power. The peak-to-peak (P-P) amplitudes of the pulse signals Vi are determined by the DC power. Although a switching circuit using full-bridge driving is illustrated in this example, another type of switching circuit, such as a switching circuit using half-bridge driving, may be used.

The pulse signals Vi generated by the pulse signal generating circuit 111 are boosted to desired AC voltage signals Vo as a result of a mutual inductance of an air-core transformer 16 and a leakage inductance thereof forming an electric resonance circuit together with an electrostatic capacitance Cd 401 of the piezoelectric element 4. The polarity of the air-core transformer 16 is a matter of design and may either be positive or negative. AC voltage signals Vo having a SIN-wave shape and boosted by the air-core transformer 16 are applied to the piezoelectric element 4. The vibration actuator 1 is capable of controlling the velocity by using the frequency, amplitude, and phase difference of the AC voltage signals Vo applied to the piezoelectric element 4.

An equivalent circuit of the piezoelectric element 4 will described. The equivalent circuit of the piezoelectric element 4 includes an RLC series circuit (an equivalent coil Lm 402, an equivalent capacitor Cm 403, and an equivalent resistor Rm 404) of a mechanical vibration portion of the vibrating body 2 and the electrostatic capacitance Cd 401 connected in parallel to the RLC series circuit. A resonant frequency fm of the vibrating body 2 is determined by Lm and Cm. The equivalent resistor Rm fluctuates in accordance with a load but does not affect the resonant frequency. During driving, Rm is about 1 kΩ. An electric resonant frequency fe of the booster circuit 112 can be adjusted by using a mutual inductance of the air-core transformer 16 and the electrostatic capacitance Cd (see FIGS. 7A to 7C described below). As a result of adjusting the electric resonant frequency fe, distortion of the waveform of the output AC voltage is reduced, and the voltage in the driving region is stabilized.

The air-core transformer 16 includes a primary-side coil 16a and a secondary-side coil 16b. These two coils are magnetically coupled to each other. That is, in response to a current flowing through the primary-side coil 16a, a magnetic flux is generated, a current is induced in the secondary-side coil 16b, and a voltage is generated. Regarding a turns ratio, the number of turns of the secondary-side coil 16b is set to about 10 to 20 times that of the primary-side coil 16a. The voltage amplitude on the primary side is amplified based on a turns ratio N and a coupling coefficient k.

Figure 13A:
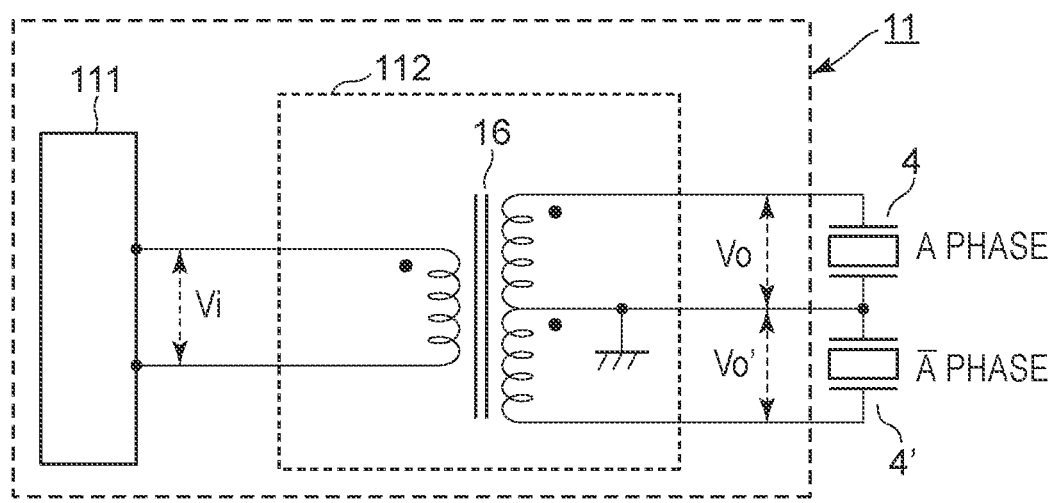
FIG. 13A is a diagram illustrating a driving unit including a center tap transformer.

FIG. 13A is a diagram illustrating the driving unit 11 including the air-core transformer 16 of a center tap type.

Figure 13B:
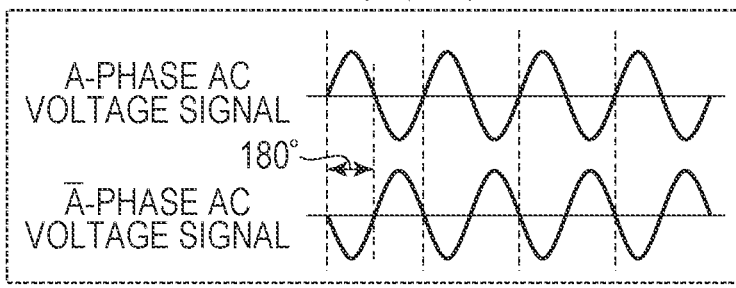
FIG. 13B is a diagram illustrating AC voltage signals.

As the air-core transformer 16 according to the present embodiment, an air-core transformer including a center tap terminal may be used. Here, a description will be given of the booster circuit 112 that applies AC voltage signals to the A phase and the A− phase. The secondary-side coil of the air-core transformer includes a center tap terminal connected to ground. As illustrated in FIG. 13B, an AC voltage signal Vo is applied to the piezoelectric element 4 of the A phase, whereas an AC voltage signal Vo' having a phase different by 180 degrees is applied to the piezoelectric element 4 of the A− phase. With use of the air-core transformer of a center tap type, the number of transformers can be reduced to half, and the mounting area of the booster circuit can be reduced.

Figure 5A:
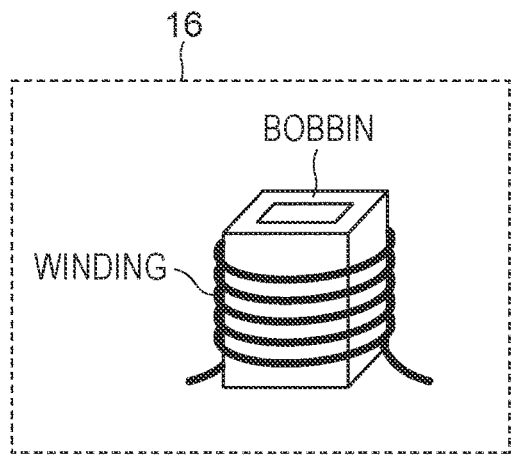
FIGS. 5A to 5D are diagrams illustrating an air-core transformer according to an embodiment and a transformer having a core.

FIG. 5A illustrates the air-core transformer 16 according to the present embodiment.

Figure 5B:
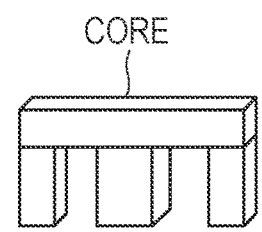
Figure 5C:
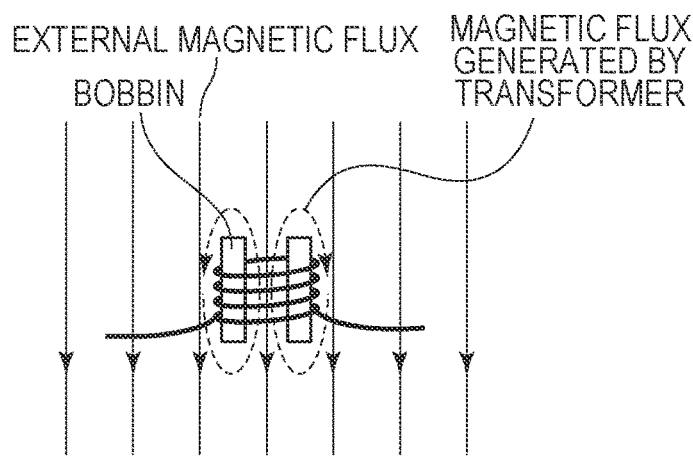
Figure 5D:
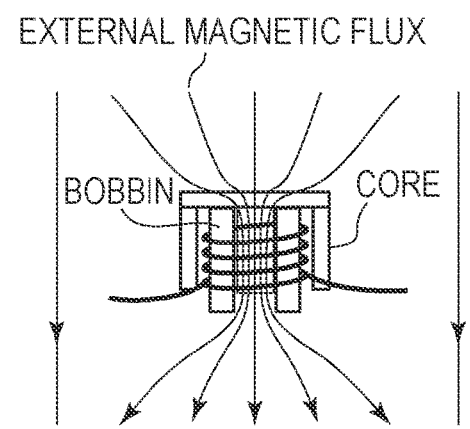

FIG. 5A illustrates an external appearance of the air-core transformer 16, in which the primary-side and secondary-side windings are wound around a bobbin. A transformer typically used as a booster circuit for driving an existing vibration actuator has a configuration in which the core illustrated in FIG. 5B is inserted into a center portion of a bobbin. With use of a core made of a magnetic material having high permeability, magnetic efficiency increases, and transform efficiency of the transformer increases. However, in application to a medical apparatus for use under a strong-magnetic-field environment, an external magnetic flux concentrates to the core as illustrated in FIG. 5D, which causes magnetic saturation. The transformer having magnetic saturation is incapable of generating a magnetic flux and incapable of performing boosting, and is thus not usable. In contrast, the air-core transformer has no core, and has a high magnetic resistance because there is an air layer around windings wound around the bobbin. Thus, the air-core transformer is less likely to be affected by an external magnetic flux, and is capable of generating a magnetic flux by using a current flowing through the windings, as illustrated in FIG. 5C. However, the coupling coefficient k of the transformer is low because there is no core, and thus the number of turns of windings for obtaining a desired inductance increases. Thus, the turns ratio N of the air-core transformer 16 according to the present embodiment is to be set by calculating it based on the following expression 5-1.

$$N = \frac{V_0}{(4/\pi) \cdot Vi \cdot k}$$ Expression 5-1

Here, Vo represents a P-P amplitude of an AC voltage signal, Vi represents a P-P amplitude of a pulse signal, and k represents the coupling coefficient of the transformer. The coefficient "4/π=1.27324" is a value used for converting a square-wave pulse signal into a SIN-wave fundamental wave component.

The coupling coefficient k of the air-core transformer according to an embodiment of the present disclosure is characterized by the following expression 5-2.

$$0.6 < k < 0.9$$ Expression 5-2

With a value within the range according to an embodiment of the present disclosure, an air-core transformer having a favorable boosting characteristic, low power consumption, and small variations in inductance can be obtained, and an optimum AC voltage signal for driving the vibration actuator can be generated. In the present example, a driving experiment was conducted under a magnetic-field environment by using air-core transformers having coupling coefficients of 0.72, 0.84, and 0.86. As for a transformer including a core, a transformer having a very high coupling coefficient of 0.95 to 0.99 is typically used.

Figure 10:
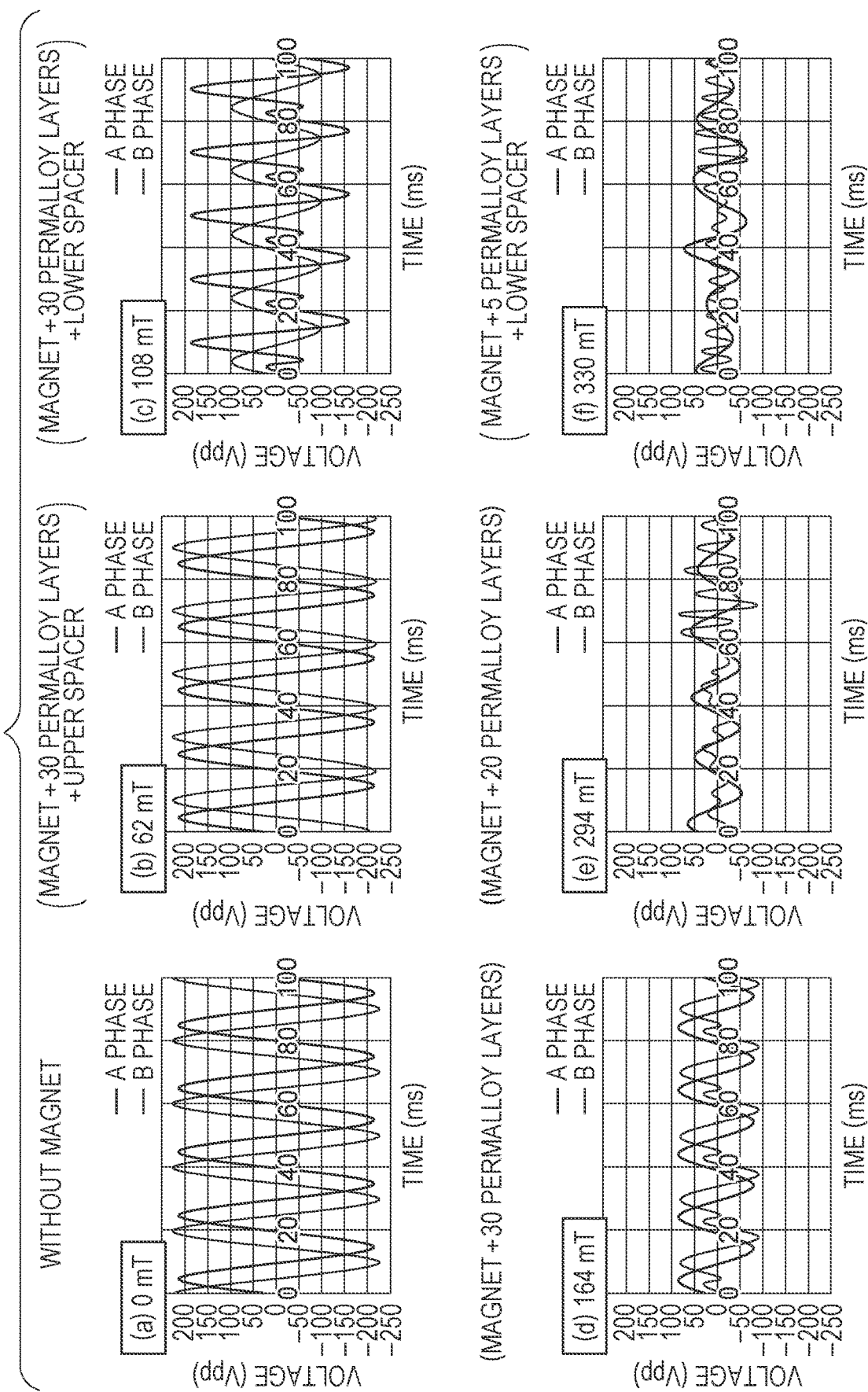
FIG. 10 illustrates actual waveforms of AC voltage signals applied to a vibration actuator in an existing vibration driving device, and illustrates results indicating influences of an external magnetic flux density on a boosting circuit.

FIG. 10 illustrates actual waveforms of AC voltage signals applied to a vibration actuator in an existing vibration driving device including a boosting circuit including a transformer in which a core is inserted into a center portion of a bobbin, and illustrates results indicating influences of an external magnetic flux density on the boosting circuit.

Before measurement, preparation was performed so that a progressive-wave-type vibration actuator according to the present embodiment can be driven by a boosting circuit including a transformer with a core under a laboratory environment. At that time, the power source of the boosting circuit was set to 24 Vdc, the driving frequency fd was set to 50 kHz, and the AC voltage signal Vo was set to about 400 Vpp. The transformer with a core used herein had a turns ratio of 12 times and a coupling coefficient of 0.98. The inductance of the secondary-side coil was 1.5 mH. A neodymium magnet was brought close to a position immediately above the transformer mounted on a substrate, and the distance between the neodymium magnet and the transformer was changed to adjust the value of an external magnetic flux density. The magnetic flux density was changed in the range of 0 mT to 330 mT. Parts (a) to (f) in FIG. 10 illustrate the waveforms of AC voltage signals of the A phase and the B phase under the individual conditions.

It is understood that, as the external magnetic flux density increases, the amplitudes of the AC voltage signals decrease, and distortion occurs to make the waveforms abnormal. The influence on the waveforms is small when the magnetic flux density is 62 mT or less. However, the influence increases when the magnetic density is 108 mT or more, and it is difficult to normally drive the vibration actuator. Furthermore, when the magnetic flux density is 294 mT or more, it is not possible to drive the vibration actuator.

Figure 11A:
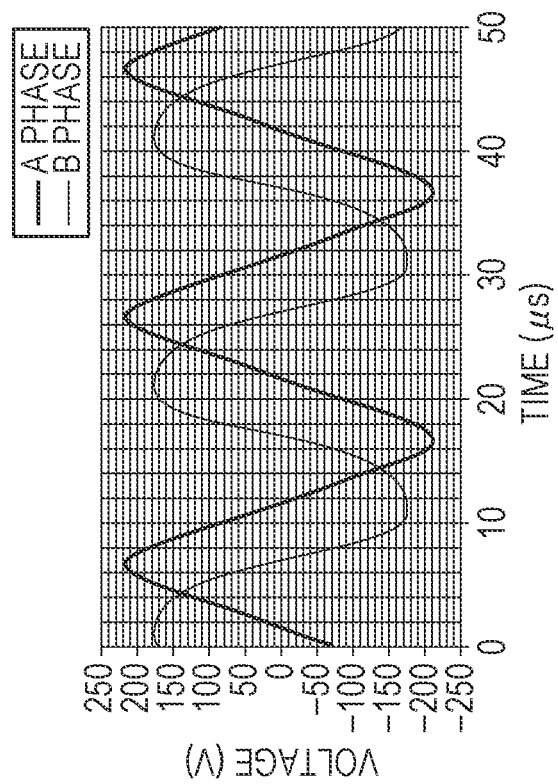
FIGS. 11A and 11B are diagrams illustrating actual waveforms of AC voltage signals applied to the vibration actuator by the vibration driving device according to an embodiment of the present disclosure.
Figure 11B:
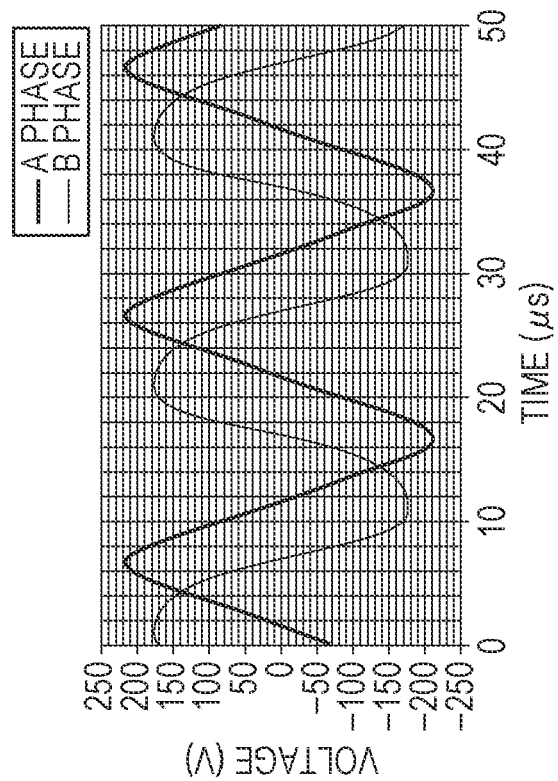

FIGS. 11A and 11B are diagrams illustrating the actual waveforms of AC voltage signals applied to a vibration actuator by the vibration driving device according to an embodiment of the present disclosure.

First, preparation was performed so that the progressive-wave-type vibration actuator according to the present embodiment can be driven by the boosting circuit including the air-core transformer 16 under a laboratory environment. Similarly to the foregoing case, the power source of the boosting circuit was set to 24 Vdc, the driving frequency fd was set to 50 kHz, and the AC voltage signal Vo was set to about 400 Vpp. The air-core transformer used herein had a turns ratio of 16.8 times and a coupling coefficient of 0.72. Since the inductance of an air-core transformer varies according to the position of a coil wound around a bobbin, the turns ratio was set in the range of 14 to 16.8 times and the coupling coefficient was set in the range of 0.72 to 0.86 so as to obtain a desired inductance. The inductance of the secondary-side coil was 1.4 mH. A neodymium magnet was brought close to a position immediately above the air-core transformer 16 mounted on a substrate, and the waveforms of AC voltage signals of the A phase and the B phase were obtained.

FIG. 11A illustrates waveforms when a magnetic flux density of 0 mT was applied from the outside, and FIG. 11B illustrates waveforms when a magnetic flux density of 600 mT was applied from the outside. The boosting circuit according to the present embodiment was capable of normally driving the vibration actuator, with the waveforms of AC voltage signals hardly changed even under a strong-magnetic-field environment of 600 mT. As a result of considerations made by the inventors of the present application, it was confirmed that the above-described vibration actuator is driven under a magnetic-field environment in which the magnetic flux density is 100 mT or more and also under a magnetic-field environment in which the magnetic flux density is 300 mT or more.

FIGS. 7A to 7C are diagrams illustrating the velocity of the vibration actuator according to the present embodiment and the frequency characteristics of AC voltage signals.

FIG. 7A is a diagram illustrating the velocity of the vibration actuator based on a driving frequency. A maximum frequency at which driving can be performed is represented by fmax, and the resonant frequency of the vibrating body indicating a velocity peak is represented by fm (44 kHz). In a control region of an AC voltage signal applied to the vibration actuator, the driving frequency fd of an AC voltage signal to be operated is within the range from a minimum frequency fmin (45 kHz) to a maximum frequency fmax (50 kHz) as illustrated in FIG. 7A. The minimum frequency fmin is set to be slightly higher than the resonant frequency fm in order to prevent the driving frequency fd from becoming lower than the resonant frequency fm, which may cause a sudden decrease in the velocity of the vibration actuator, resulting in an uncontrollable state. As a frequency to be set at the startup of the vibration actuator, a frequency enabling stable startup is set in consideration of control performance within the range from the minimum frequency fmin to the maximum frequency fmax.

The resonant frequency fm of the vibrating body is calculated by using the following expression 7-1, and is dependent on the equivalent coil Lm 402 and the equivalent capacitor Cm 403 in the mechanical vibration portion of the vibrating body (see the piezoelectric element 4 in FIG. 4).

$$f_m = \frac{1}{2\pi\sqrt{L_m \cdot C_m}}$$ Expression 7-1

FIG. 7B is a diagram illustrating the frequency characteristics of the AC voltage signal Vo of the boosting circuit. A boosting circuit element and the electrostatic capacitance Cd 401 of the piezoelectric element 4 form an electric resonance circuit. At the electric resonant frequency fe, the voltage amplitude exhibits a peak. The electric resonant frequency fe according to the first embodiment (the resonance circuit illustrated in FIG. 4) is determined by the air-core transformer 16 and individual constants of the leakage inductance Le and the electrostatic capacitance Cd, and is calculated by using the following expression 7-2.

$$f_e = \frac{\sqrt{(L2 \cdot (L_c + L1) - M^2) \cdot C_d}}{2\pi}, M = \sqrt{L1 \cdot L2}$$ Expression 7-2

As illustrated in FIG. 7B, the electric resonant frequency fe may be set to a high frequency side of the maximum frequency fmax (1.1 to 2.0 times). Appropriate setting of the electric resonant frequency fe makes it possible to output a stable AC voltage signal having a small waveform distortion. Here, L1 represents the inductance of the primary-side coil of the air-core transformer 16, and L2 represents the inductance of the secondary-side coil of the air-core transformer 16. M represents the mutual inductance of the air-core transformer 16.

With use of a boosting circuit according to a second embodiment or a boosting circuit according to a third embodiment, which will be described below, a more favorable AC voltage signal can be generated. The boosting circuit according to the second embodiment (the resonance circuit illustrated in FIG. 8) includes an air-core coil on the primary side of the air-core transformer. The air-core coil enables the electric resonant frequency fe to be decreased and harmonics of an AC voltage signal to be reduced, and thus the circuit efficiency can be increased. FIG. 7C illustrates actual waveforms obtained when the vibration actuator is driven at a driving frequency fd of 50 kHz. In the second embodiment, a third harmonic is reduced, and a smooth SIN waveform is obtained. The boosting circuit according to the third embodiment (the resonance circuit illustrated in FIG. 9) includes a capacitor and an air-core coil on the primary side of the air-core transformer. With use of the capacitor and the air-core coil, voltage fluctuations near the resonant frequency fm of the vibrating body can be suppressed, and the controllability of the vibration actuator can be increased.

The vibration driving device according to an embodiment of the present disclosure has been described above.

Next, an application example of the vibration driving device according to an embodiment of the present disclosure will be described.

Figure 2A:
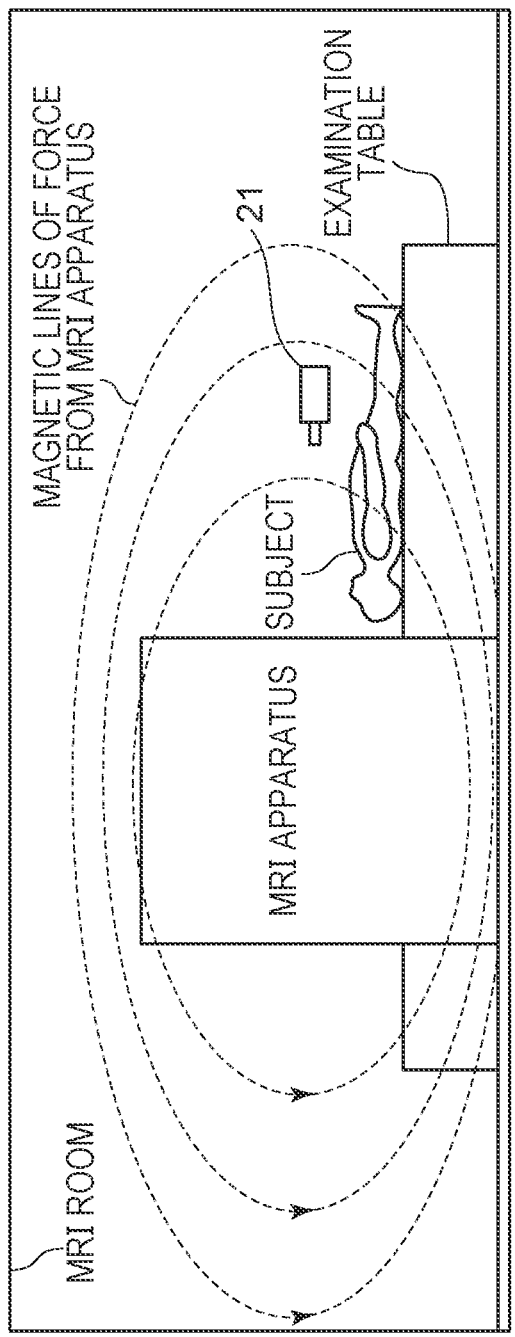
FIG. 2A is a plan view illustrating an external appearance of a medical apparatus, which is an application example of the vibration driving device according to an embodiment of the present disclosure.
Figure 2B:
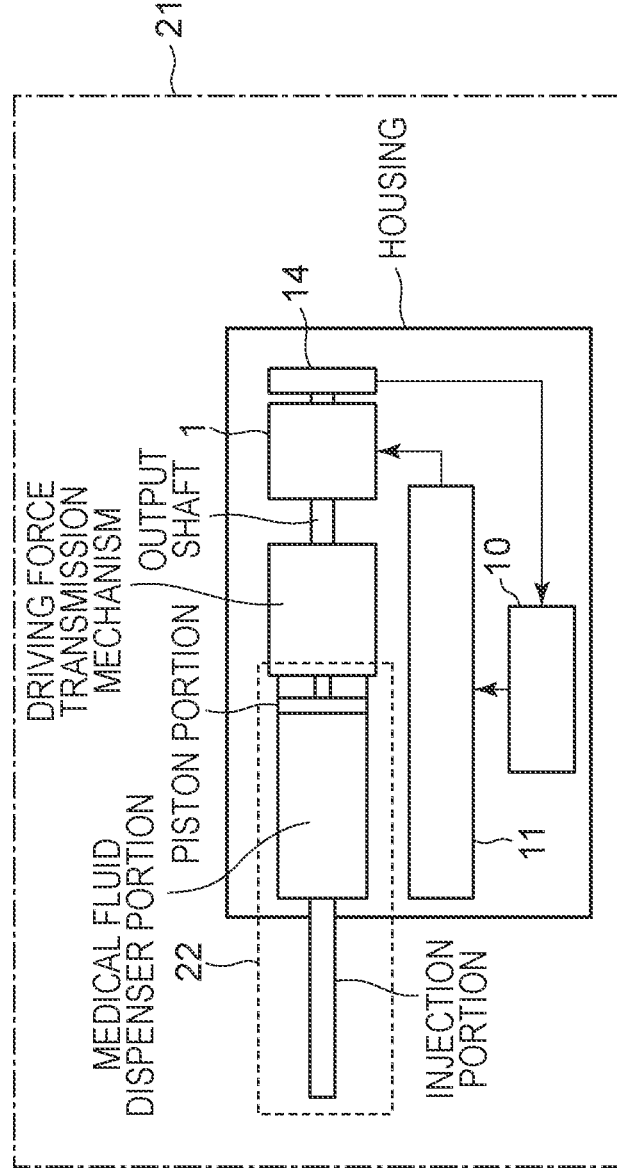
FIG. 2B is a schematic diagram illustrating an internal structure of the medical apparatus.

FIG. 2A is a plan view illustrating an external appearance of a medical apparatus 21, which is an application example of the vibration driving device according to an embodiment of the present disclosure, and FIG. 2B is a schematic diagram illustrating an internal structure of the medical apparatus 21. A portable vibration driving device is used in which the vibration actuator 1, and the control unit 10 and the driving unit 11 serving as a control device, are accommodated in a housing.

An MRI apparatus used in the medical field is capable of capturing a tomographic image of a subject in real time by using a magnetic resonance effect. In that case, an operator may inject a medical fluid, such as a contrast medium or a physiological salt solution, into a subject at a desired timing. Non-magnetization of a medical apparatus such as an injection apparatus capable of mechanically performing the injection is desired. FIG. 2A is a plan view illustrating an external appearance of the medical apparatus 21 that is to be used on an examination table of an MRI apparatus and the vicinity thereof. The medical apparatus 21 according to the present embodiment includes the vibration actuator 1, which serves as a driving source of an injection operation, and the control device 12 (including the control unit 10, the driving unit 11, and the position detecting unit 14), and can be freely carried. A driving unit of a typical vibration actuator is susceptible to an external magnetic field, does not normally operate near an MRI apparatus, and is thus to be installed at a place of not being affected by a magnetic field by using an extended power feeding cable. In contrast, the driving unit of the vibration actuator according to an embodiment of the present disclosure, which includes an air-core transformer, is capable of normally outputting an AC voltage signal even under a strong-magnetic-field environment, and thus the control device including the driving unit can be disposed in the same housing.

FIG. 2B is a schematic diagram illustrating an internal structure of the medical apparatus 21 according to the present embodiment, which is capable of injecting a medical fluid into a subject of imaging performed by the MRI apparatus.

The medical apparatus 21 is constituted by a housing including a medical device 22, a driving force transmission mechanism, the vibration actuator 1, the position detecting unit 14, the control unit 10, and the driving unit 11. The medical device 22 includes an injection portion, a medical fluid dispenser portion, and a piston portion, and has a function of injecting a medical fluid from the injection portion into a subject by a sliding operation of the piston portion. As depicted in FIG. 2B, at least part of the medical device 22 may be accommodated in the housing.

The medical fluid dispenser portion is constituted by a syringe filled with a medical fluid, such as a contrast medium or a physiological salt solution. The medical apparatus 21 according to the present embodiment converts rotational driving of the vibration actuator 1 to linear driving by using the driving force transmission mechanism, thereby causing the piston portion to slide. The position detecting unit 14 detects a relative position, and the control unit 10 feedback-controls the position or velocity of the vibration actuator 1. Accordingly, an injection amount and an injection velocity of a medical fluid can be controlled.

The medical device 22 may be a device other than a medical agent dispenser according to the present embodiment. For example, an injector, an aspirator, a puncture needle, or the like may be used.

Next, steps of using the medical apparatus 21 according to the present embodiment will be described. In a step of preparing the medical apparatus 21, a medical fluid to be injected into a subject is selected and a set amount of the medical fluid is charged outside an MRI room, such as in a general ward or an intensive care unit (ICU) (step 1). The preparation step may be performed in the MRI room.

Subsequently, the medical apparatus 21 is carried into the MRI room and is located near the MRI apparatus, that is, under a magnetic-field environment having a magnetic flux density of 100 mT or more (step 2). Subsequently, an operator performs an operation of injecting the medical fluid into a subject on the examination table under the magnetic-field environment by using the medical apparatus 21 (step 3).

After that, similar steps are repeated for the same subject or another subject.

As described above, by applying the vibration driving device according to the present embodiment, a portable medical apparatus capable of operating even under a strong-magnetic-field environment can be implemented. In addition, a medical system including the above-described medical apparatus and an MRI apparatus can be implemented.

Second Embodiment

Another embodiment of the present disclosure will be described.

Figure 8:
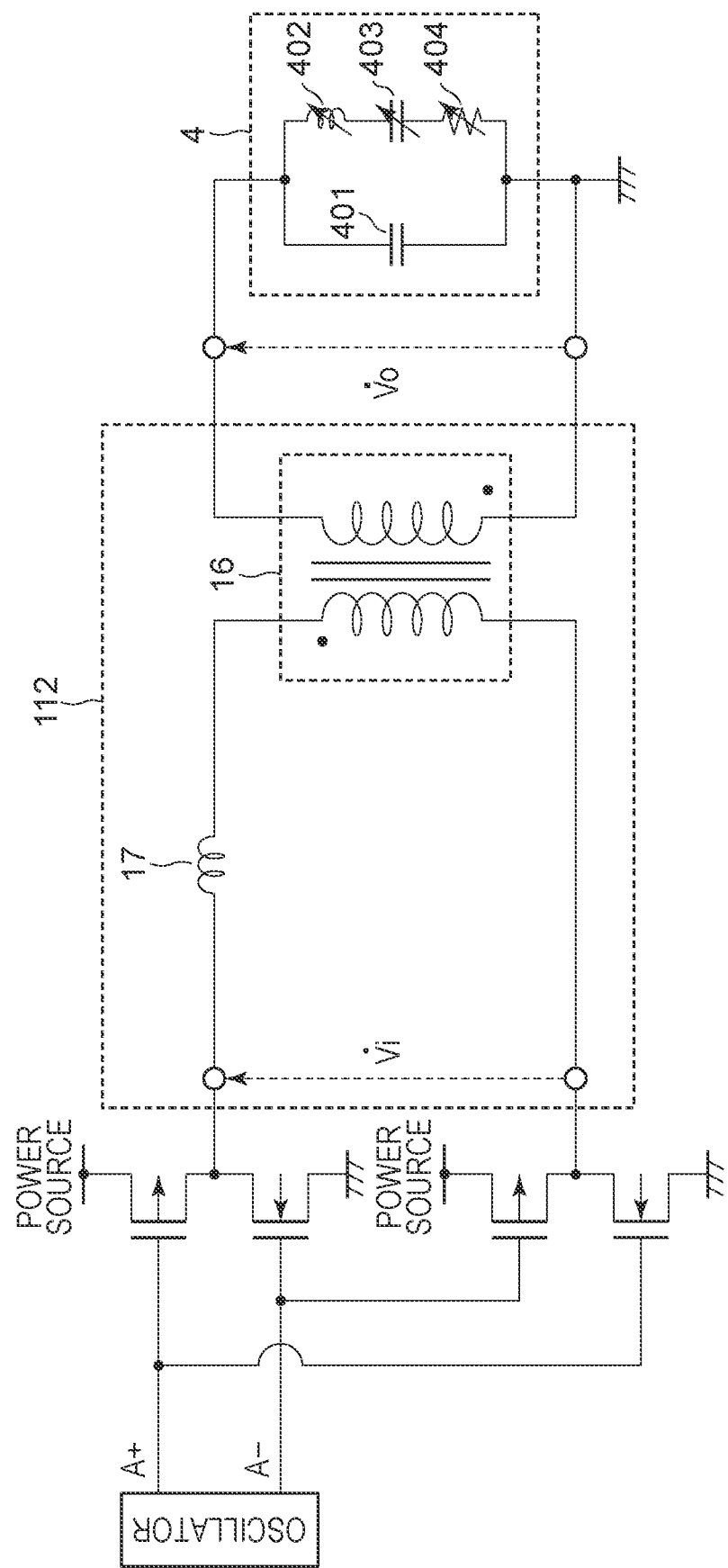
FIG. 8 is a diagram illustrating a driving unit according to a second embodiment of the present disclosure.

FIG. 8 is a diagram illustrating a driving unit according to a second embodiment of the present disclosure.

With use of a boosting circuit according to the second embodiment, a more favorable AC voltage signal can be generated under a strong-magnetic-field environment. The boosting circuit 112 includes an air-core coil 17 on the primary side of the air-core transformer 16. The air-core coil 17 enables the electric resonant frequency fe to be decreased and harmonics of the AC voltage signal Vo to be reduced, and thus circuit efficiency can be increased. For example, the air-core coil 17 may have an inductance of 4.7 to 15 μH.

The electric resonant frequency fe according to the second embodiment is determined by the air-core transformer 16 and individual constants of the leakage inductance Le, the inductance Lc of the air-core coil 17, and the electrostatic capacitance Cd of the piezoelectric element 4, and is calculated by using the following expression 8-1.

$$f_e = \frac{\sqrt{(L2 \cdot (L_c \cdot Lc + L1) - M^2) \cdot C_d}}{2\pi}, M = \sqrt{L1 \cdot L2} \quad \text{Expression 8-1}$$

As a result of appropriately setting the electric resonant frequency fe to the high frequency side of the maximum frequency fmax (1.1 to 1.5 times), a stable AC voltage signal having a small waveform distortion can be output. Here, L1 represents the inductance of the primary-side coil of the air-core transformer 16, and L2 represents the inductance of the secondary-side coil of the air-core transformer 16. M represents the mutual inductance of the air-core transformer 16. Although the air-core coil 17 is disposed on the primary side of the air-core transformer 16 in the present embodiment, the air-core coil 17 may be disposed on the secondary side, and may be connected in series or parallel to the air-core transformer 16.

Third Embodiment

Another embodiment of the present disclosure will be described.

Figure 9:
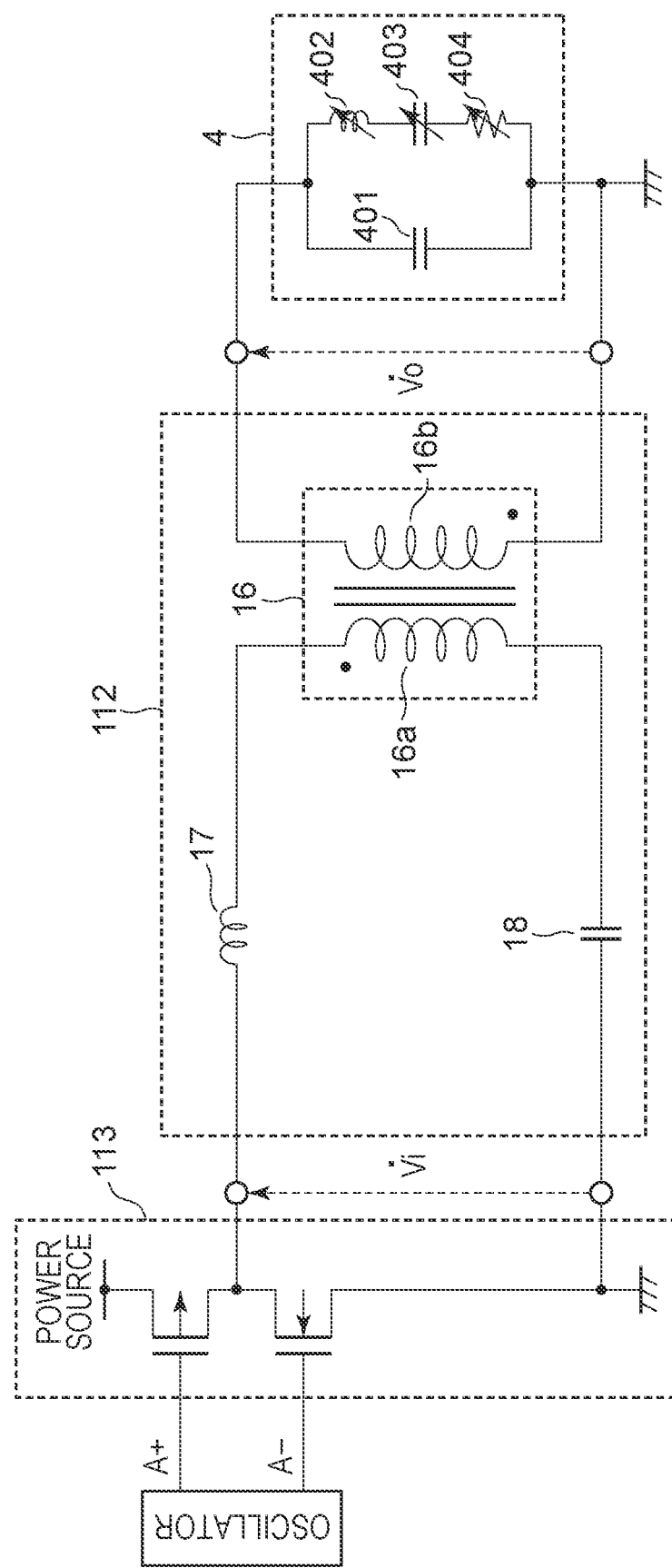
FIG. 9 is a diagram illustrating a driving unit according to a third embodiment of the present disclosure.

FIG. 9 is a diagram illustrating a driving unit according to a third embodiment of the present disclosure.

With use of a boosting circuit according to the third embodiment, a more favorable AC voltage signal Vo can be generated under a strong-magnetic-field environment. The boosting circuit 112 includes the air-core coil 17 and a capacitor 18 on the primary side of the air-core transformer 16. As a result of making a series resonant frequency of the air-core coil 17 and the capacitor 18 equal to or close to the resonant frequency fm of the vibrating body, voltage fluctuation near the resonant frequency fm can be suppressed, and the controllability of the vibration actuator can be increased. For example, the air-core coil 17 may have an inductance of 4.7 to 15 μH, and the capacitor 18 may have a capacitance of 0.5 to 1.5 μF. The capacitor 18 may be a film capacitor or a multilayer ceramic capacitor, both of which are non-magnetic elements insusceptible to an external magnetic flux. The electric resonant frequency fe according to the third embodiment is determined by the air-core transformer 16 and individual constants of the inductance Lc of the air-core coil 17, the capacitance C of the capacitor 18, and the electrostatic capacitance Cd of the piezoelectric element 4, and is calculated by using the following expression 9-1.

$$f_e = \frac{1}{2\pi\sqrt{(Lc \cdot L2 \cdot C \cdot C_d)/(L1 \cdot C + L2 \cdot C_d)}} \quad \text{Expression 9-1}$$

As a result of appropriately setting the electric resonant frequency fe to the high frequency side of the maximum frequency fmax (1.1 to 1.5 times), a stable AC voltage signal having a small waveform distortion can be output. Here, L1 represents the inductance of the primary-side coil of the air-core transformer 16, and L2 represents the inductance of the secondary-side coil of the air-core transformer 16. To simplify the expression, the leakage inductance Le of the air-core transformer 16 is omitted.

A pulse signal generating circuit 113 according to the third embodiment has the capacitor 18 disposed between the primary-side coil of the transformer and ground, and is thus capable of using a half-bridge switching circuit. With use of the half-bridge type, the switching circuit can be simplified and the number of switching elements can be reduced. Thus, heat generation of the pulse signal generating circuit 113 can be reduced. The boosting circuit according to the present embodiment is also capable of using a full-bridge type. The capacitor 18 may be connected to the secondary side.

Fourth Embodiment

FIGS. 12A to 12D are diagrams for describing a linear-driving vibration actuator.

The vibration driving device according to an embodiment of the present disclosure can also be applied to a linear-driving vibration actuator and can be used under a strong-magnetic-field environment. In the case of applying the linear-driving vibration actuator to the medical apparatus illustrated in FIGS. 2A and 2B, the driving force transmission mechanism connecting the medical device 22 and the vibration actuator 1 may be changed. For example, a guide member or a transmission gear of a linear rolling mechanism may be used.

Figure 12A:
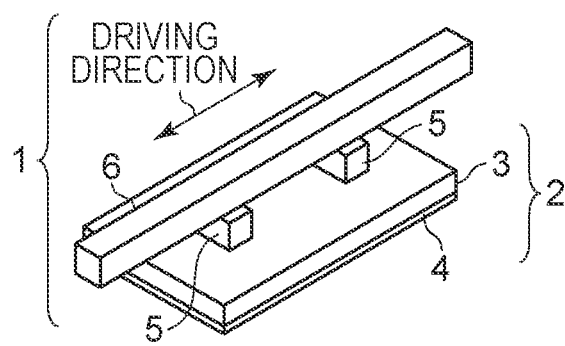
FIGS. 12A to 12D are diagrams for describing a linear-driving vibration actuator.

The vibration actuator 1 illustrated in FIG. 12A includes the vibrating body 2 including the elastic body 3 and the piezoelectric element 4, which is an electromechanical energy conversion element bonded to the elastic body 3; and the contact body 6 driven by the vibrating body 3. Application of AC voltage signals to the piezoelectric element 4 generates two vibration modes illustrated in FIGS. 12C and 12D and moves the contact body 6 that is in pressure contact with protruding portions 5 in the directions indicated by arrows.

Figure 12B:
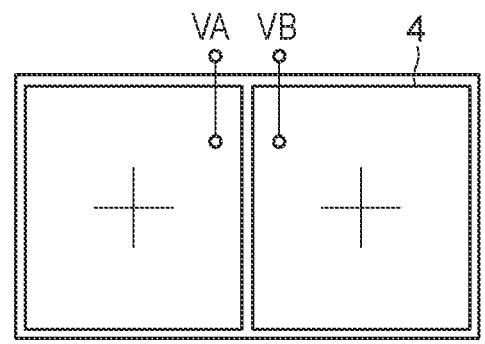
Figure 12C:
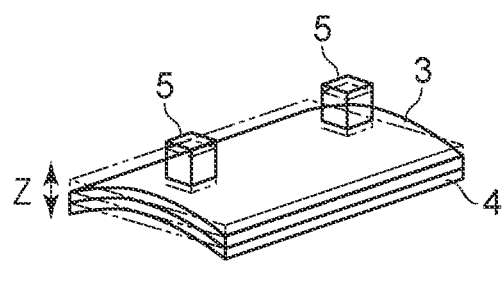

FIG. 12B is a diagram illustrating an electrode pattern of the piezoelectric element 4, in which two electrode regions are arranged in the longitudinal direction, for example. The polarization directions of the individual electrode regions are the same, that is, positive. In the two electrode regions of the piezoelectric element 4, an AC voltage signal (VB) is applied to the electrode region located on the right in FIG. 12B, and an AC voltage signal (VA) is applied to the electrode region located on the left.

When the AC voltage signals VB and VA have a frequency near the resonant frequency of a first vibration mode and have the same phase, the entire piezoelectric element 4 (the two electrode regions) expands at a moment and contracts at another moment. As a result, vibration in the first vibration mode (vertical vibration) illustrated in FIG. 12C occurs in the vibrating body 2. Accordingly, a displacement in a vertical direction (Z direction) occurs in the protruding portions 5.

When the AC voltage signals VB and VA have a frequency near the resonant frequency of a second vibration mode and have phases different from each other by 180 degrees, the right electrode region contracts and the left electrode region expands in the piezoelectric element 4 at a moment. The opposite occurs at another moment. As a result, vibration in the second vibration mode (horizontal vibration) illustrated in FIG. 12D occurs in the vibrating body 2. Accordingly, a displacement in a driving direction (X direction) occurs in the protruding portions 5.

Thus, as a result of applying AC voltage signals having frequencies near the resonant frequencies of the first and second vibration modes to the electrodes of the piezoelectric element 4, a progressive wave or a standing wave in which the first and second vibration modes are combined can be excited.

Figure 12D:
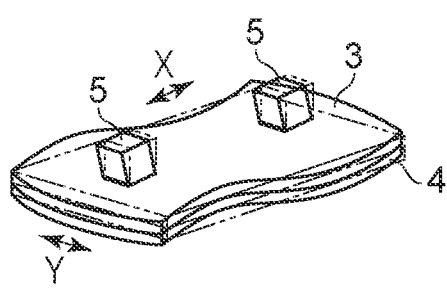

With the two vibration modes being combined in this manner, the protruding portions 5 perform an elliptic motion in the cross section vertical to the Y direction in FIG. 12D. The elliptic motion causes the contact body 6 to be driven in the direction indicated by the arrow in FIG. 12A. The direction in which the contact body 6 and the vibrating body 2 move relatively to each other, that is, the direction in which the contact body 6 is driven by the vibrating body 2 (X direction), is referred to as a driving direction.

The amplitude ratio of the second vibration mode to the first vibration mode (horizontal vibration amplitude/vertical vibration amplitude) can be changed by changing the phase difference between the AC voltage signals of two phases input to the two electrode regions. In this vibration actuator, the velocity of the contact body can be changed by changing the amplitude ratio of vibration.

According to an embodiment of the present disclosure, a portable vibration driving device capable of operating under a strong-magnetic-field environment can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-023442, filed Feb. 17, 2021, which is hereby incorporated by reference herein in its entirety.

What is claimed is:
1. A vibration driving device comprising:
a vibration actuator including a vibrating body and a contact body, the vibrating body including an elastic body and an electromechanical energy conversion element, the contact body being in contact with the vibrating body and movable relatively to the vibrating body; and
a control device including a signal generating circuit and a boosting circuit, the boosting circuit including an air-core transformer electrically connected to the signal generating circuit, wherein
the vibration actuator is configured to receive a signal output by the control device,
wherein the air-core transformer has a coupling coefficient k that satisfies an expression:
0.6<k<0.9, and
wherein the air-core transformer has a turns ratio N that satisfies an expression:

$$N = \frac{V_0}{(4/\pi) \cdot Vi \cdot k},$$

where Vo represents a peak-to-peak amplitude of an alternating-current voltage signal, Vi represents a peakto-peak amplitude of a pulse signal, and k represents the coupling coefficient of the air-core transformer.

2. The vibration driving device according to claim 1, wherein the air-core transformer includes a bobbin and a coil wound around the bobbin without a core.

3. The vibration driving device according to claim 1, wherein the air-core transformer includes a center tap terminal.

4. The vibration driving device according to claim 1, wherein the boosting circuit further includes an air-core coil electrically connected to the air-core transformer.

5. The vibration driving device according to claim 4, wherein the boosting circuit further includes a capacitor connected to the air-core coil in series.

6. The vibration driving device according to claim 1, wherein the vibration actuator has a velocity controlled by at least one of a frequency, a phase difference, or a pulse width generated by the signal generating circuit.

7. The vibration driving device according to claim 1, wherein the signal comprises a pulse signal.

8. The vibration driving device according to claim 1, further comprising
a housing, wherein
the vibration actuator and the control device are accommodated in the housing.

9. A medical apparatus comprising:
the vibration driving device according to claim 1; and
a medical device configured to be driven by the vibration actuator.

10. The medical apparatus according to claim 9, wherein the medical device includes at least one of a medical agent dispenser, an injector, an aspirator, and a puncture needle.

11. The medical apparatus according to claim 9, wherein the medical apparatus is configured to be driven under a magnetic-field environment having a magnetic flux density of 100 mT or more.

12. The medical apparatus according to claim 11, wherein the medical apparatus is configured to be driven under a magnetic-field environment having a magnetic flux density of 300 mT or more.

13. A medical system comprising:
the medical apparatus according to claim 9; and
a magnetic resonance imaging (MRI) apparatus.

14. A method of using a medical apparatus, comprising:
preparing the medical apparatus according to claim 9;
locating the medical apparatus under a magnetic-field environment having a magnetic flux density of 100 mT or more; and
using the medical apparatus under the magnetic-field environment.

\* \* \* \* \*